UNITED STATES PATENT OFFICE.

MAURICE A. SMITH, OF JEANNETTE, PENNSYLVANIA.

METHOD OF MAKING GLASSWARE.

1,239,051.      Specification of Letters Patent.      Patented Sept. 4, 1917.

No Drawing.      Application filed May 27, 1916. Serial No. 100,345.

*To all whom it may concern:*

Be it known that I, MAURICE A. SMITH, a citizen of the United States, and resident of Jeannette, in the county of Westmoreland and State of Pennsylvania, have invented a new and useful Improvement in Methods of Making Glassware; and I do hereby declare the following to be a full, clear, and exact description thereof.

My invention relates to a method of making glassware, the object being to take an ordinary pressed bowl or other shape made from lime glass and pressed with an exterior configuration in the ordinary manner, and subjecting the article to such a treatment that when finished it will have practically all the high polish and finish of a cut-glass bowl made from lead glass.

In carrying out my method, the lime glass batch is melted in a covered crucible in the ordinary way, the glass when brought to the proper molten state is gathered in the ordinary manner and introduced into a mold having the desired design formed therein. The pressing then takes place in the ordinary manner by the lowering of a suitable plunger into the mold and the glass is forced into the depressions in the mold, which produces the desired design on the exterior of the bowl or other article being pressed. After the pressing operation, the article is removed from the mold and may then be subjected on the inside to a hot fire blast, which gives a high polish to the interior of the article removing any blemishes or imperfections caused by the contact of the plunger with the glass in the pressing of the glass, while, at the same time, the exterior may also be subjected to the same character of blast.

The article is then annealed in an annealing oven by which it is tempered and is then in condition to be taken to the cutting shop where the design already pressed in the article by the pressing operation is gone over with a cutting or grinding tool roughing and smoothing the pattern to define the design more clearly, and where leaves or flowers are part of the design, to cut and finish the same so as to bring them out.

The inside of the article is then coated with a coating of wax, which may be applied with a brush, said wax consisting preferably of a mixture of paraffin and beeswax. The article is then dipped into a mixture of hydrofluoric and sulfuric acid, the proportion of the acids being preferably about three parts of hydrofluoric to one part of sulfuric acid. The coating of the wax on the interior of the article protects it against the acid.

Glass is a mixture of sodium silicates and lime silicates, and when it is immersed in the polishing solution of hydrofluoric and sulfuric acid, the result is, that the hydrofluoric acid attacks the glass, breaking up the silicates; the silicon reacts with the hydrofluoric acid to form silicon fluorid, and the sodium and calcium then reacts with the sulfuric acid to form sodium and calcium sulfates. The acid sulfates of soda and lime are soluble in water.

The dips or intervals of time in which the article remains in the acid bath vary according to the article to allow just the right formation of coating to appear on the outside. Three or four dips of fifteen seconds each, or two dips of thirty seconds each and one of fifteen seconds produce good results. However, the acid bath may vary as to time and mixture.

The coating of the sulfates of soda and sulfates of lime as above set forth is soluble in water after each dip in the acid. The article is washed with water and the acid sulfates of soda and lime are removed, leaving a highly polished surface.

In this manner, I provide a method of treating lime glass articles in such a way as to produce a very high polish and finish so that when the article is used as cut glass, it has practically all the brilliancy and appearance of lead cut glass.

What I claim is:

1. The method of making articles of glassware, consisting in pressing the article with a configuration on the surface thereof, roughing and smoothing the pattern pressed on the article by grinding, and applying an attacking acid to the same.

2. The method of making articles of glassware, consisting in pressing the article with a configuration on the surface thereof, roughing and smoothing the pattern pressed on the surface of the article by grinding, and applying a solution of hydrofluoric and sulfuric acid to the same, and washing the surface with water.

3. The method of making articles of glassware, consisting in pressing the same with a configuration on the surface thereof, subjecting the interior of the article to a hot blast, roughing and smoothing the configuration on the surface of the glass by grinding, applying a protecting coating on the interior, and applying an attacking acid to the roughened and smoothed portion.

In testimony whereof, I the said MAURICE A. SMITH, have hereunto set my hand.

MAURICE A. SMITH.

Witnesses:
ROBT. D. TOTTEN.
JOHN F. WILL.

Copies of this patent may be obtained for five cents each, by addressing the "Commissioner of Patents, Washington, D. C."